(12) United States Patent
Branson et al.

(10) Patent No.: US 10,706,724 B2
(45) Date of Patent: Jul. 7, 2020

(54) CONTROLLING ARTICULATING SENSORS OF AN AUTONOMOUS VEHICLE

(71) Applicant: GM GLOBAL TECHNOLOGY OPERATIONS LLC, Detroit, MI (US)

(72) Inventors: Elliot Branson, San Francisco, CA (US); Eric Lujan, San Francisco, CA (US); Benjamin Earle Weinstein-Raun, Berkeley, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 161 days.

(21) Appl. No.: 16/052,088

(22) Filed: Aug. 1, 2018

(65) Prior Publication Data

US 2020/0043343 A1 Feb. 6, 2020

(51) Int. Cl.
*G08G 1/16* (2006.01)
*B25J 9/00* (2006.01)
(Continued)

(52) U.S. Cl.
CPC ............... *G08G 1/166* (2013.01); *G01S 7/40* (2013.01); *G01S 7/4026* (2013.01); *G01S 7/4817* (2013.01); *G05D 1/0214* (2013.01); *G05D 1/0234* (2013.01); *G05D 1/0246* (2013.01); *G05D 1/0257* (2013.01); *G08G 1/0112* (2013.01); *G08G 1/04* (2013.01); *H04N 5/23299* (2018.08); *G05D 1/0088* (2013.01); *G05D 2201/0213* (2013.01); *G06K 9/00805* (2013.01)

(58) Field of Classification Search
CPC ... G08G 1/16; G05D 1/00; G05D 1/02; B62D 33/08; G06T 7/536; B25J 9/00; G05Q 50/28; G06F 7/70
See application file for complete search history.

(56) References Cited

U.S. PATENT DOCUMENTS 5,559,695 A * 9/1996 Daily ..................... G01S 11/12
345/501
5,714,947 A 2/1998 Richardson et al.
(Continued)

FOREIGN PATENT DOCUMENTS

CN 107539234 A 1/2018

*Primary Examiner* — Yuri Kan
(74) *Attorney, Agent, or Firm* — Medley, Behrens & Lewis, LLC

(57) ABSTRACT

An autonomous vehicle is described herein. The autonomous vehicle comprises a first sensor and a second sensor having limited fields of view, an articulation system, and a computing system. The computing system determines a first region and a second region external to the autonomous vehicle based on a sensor prioritization scheme comprising a ranking of regions surrounding the autonomous vehicle. The computing system then causes the articulation system to orient the first sensor towards the first region and the second region towards the second region. Responsive to receiving a sensor signal from the first sensor indicating that an object has entered a field of view of the first sensor, the computing system determines a third region having a higher ranking than the second region within the sensor prioritization scheme. The computing system then causes the articulation system to orient the second sensor towards the third region.

20 Claims, 10 Drawing Sheets

(51) Int. Cl.

| | |
|---|---|
| *G06Q 50/28* | (2012.01) |
| *B62D 33/08* | (2006.01) |
| *H04N 5/232* | (2006.01) |
| *G01S 7/40* | (2006.01) |
| *G01S 7/481* | (2006.01) |
| *G05D 1/02* | (2020.01) |
| *G08G 1/01* | (2006.01) |
| *G08G 1/04* | (2006.01) |
| *G05D 1/00* | (2006.01) |
| *G06K 9/00* | (2006.01) |

(56) References Cited

U.S. PATENT DOCUMENTS

| | | |
|---|---|---|
| 9,739,570 B1 | 8/2017 | Beard |
| 2006/0089765 A1 | 4/2006 | Pack et al. |
| 2011/0234464 A1 | 9/2011 | Hall |
| 2014/0136414 A1* | 5/2014 | Abhyanker ............ G06Q 50/28 705/44 |
| 2015/0202770 A1* | 7/2015 | Patron ...................... B25J 5/007 700/245 |
| 2018/0032085 A1* | 2/2018 | Dolgov ................ G05D 1/0276 |
| 2019/0005667 A1* | 1/2019 | Khawaja ............ G06K 9/00798 |
| 2019/0056739 A1* | 2/2019 | Sunil Kumar ....... G05D 1/0212 |
| 2019/0278293 A1* | 9/2019 | Levinson ............. G05D 1/0274 |
| 2019/0367102 A1* | 12/2019 | Haban ...................... B60Q 1/28 |

* cited by examiner

CONTROLLING ARTICULATING SENSORS OF AN AUTONOMOUS VEHICLE

BACKGROUND

An autonomous vehicle is a motorized vehicle that can operate without human conduction. An exemplary autonomous vehicle includes a plurality of sensor systems, such as, but not limited to, a lidar sensor system, a camera sensor system, and a radar sensor system, amongst others. The autonomous vehicle operates based upon sensor signals output by the sensor systems, wherein the sensor signals can be analyzed by the autonomous vehicle to identify objects in regions surrounding the autonomous vehicle.

Sensors in a sensor system may have limited field of views, meaning that the sensors have a limited angle (i.e., less than 360°) through which they can detect electromagnetic radiation and other observable phenomena surrounding the autonomous vehicle. For instance, a radar sensor of the autonomous vehicle may have a field of view ranging from 10 to 15°, while a lidar sensor of the autonomous vehicle may have a field of view ranging from 40 to 60°.

As a complete view of regions surrounding the autonomous vehicle is critical to effective navigation, autonomous vehicles typically include many sensors of many different sensor types directed towards different regions surrounding the autonomous vehicle. However, for practical and technological reasons, it is often impractical to have sensors directed towards every region surrounding the autonomous vehicle.

Conventionally, autonomous vehicles do not direct sensors towards regions external to the autonomous vehicles based upon relative importance of the regions. The foregoing can detrimentally impact operation of the autonomous vehicle. Moreover, conventional autonomous vehicles are not configured to direct sensors based upon a type of maneuver that is being executed by the autonomous vehicle.

SUMMARY

The following is a brief summary of subject matter that is described in greater detail herein. This summary is not intended to be limiting as to the scope of the claims.

Described herein are various technologies pertaining to operation of an autonomous vehicle. More specifically, described herein is a technique for orienting articulating sensors of an autonomous vehicle based upon a sensor prioritization scheme that ranks regions surrounding the autonomous vehicle in order of importance. Rankings of regions in the sensor prioritization scheme may be different based upon a type of maneuver that is to be performed by the autonomous vehicle.

The autonomous vehicle comprises a first sensor having a first limited field of view, a second sensor having a second limited field of view, an articulation system, and a computing system. In an example, the first sensor and/or the second sensor may be radar sensors, lidar sensors, or cameras. In another example, the first limited field of view and the second limited field of view may be 10 to 15°. The articulation system is configured to orient (e.g., rotate) the first sensor and the second sensor towards regions surrounding the autonomous vehicle. The computing system is in communication with the first sensor, the second sensor, and the articulation system.

In operation, the autonomous vehicle is operating on a road or path and is to execute a maneuver. For instance, the autonomous vehicle may execute a left turn. The computing system of the autonomous vehicle determines a first region and a second region external to and surrounding the autonomous vehicle based upon a sensor prioritization scheme. The sensor prioritization scheme comprises rankings of regions surrounding the autonomous vehicle for different maneuvers (e.g., left turn, right turn, parking, etc.) performed by the autonomous vehicle. Regions with high rankings in the sensor prioritization scheme are regions that have been identified as important to continually monitor with sensors of the autonomous vehicle, whereas regions with low rankings in the sensor prioritization scheme are regions that have been identified as less important to continually monitor with the sensors. The rankings in the sensor prioritization scheme may be based upon what a human driver would direct his or her attention towards when operating a conventional motorized vehicle.

The computing system then causes the articulation system to orient the first sensor towards the first region such that the first limited field of view of the first sensor encompasses the first region. The computing system also causes the articulation system to orient the second sensor towards the second region such that the second limited field of view of the second sensor encompasses the second region.

Subsequently, the computing system receives a first sensor signal from the first sensor indicating that an object has entered the first limited field of view of the first sensor. For instance, the first sensor signal may indicate that an oncoming vehicle has entered the first limited field of view of the first sensor, thereby obscuring the first limited field of view. In an example, the oncoming vehicle may be signaling an intent to make a left turn. Responsive to receiving the first sensor signal, the computing system determines a third region external to the autonomous vehicle based upon the sensor prioritization scheme. The third region has a higher ranking than the second region within the sensor prioritization scheme. As such, the computing system causes the articulation system to orient the second sensor towards the third region such that the second field of view encompasses the third region.

The computing system then receives a second sensor signal from the second sensor (and/or the first sensor). In an example, the second sensor signal indicates that the third region is clear from objects (e.g., vehicles) that would impede execution of the maneuver, and as a result the computing system causes the autonomous vehicle to complete execution of the maneuver. In another example, the second sensor signal indicates that a second object has entered the second limited field of view of the second sensor, wherein the second object impedes completion of the maneuver. In the example, the computing system may cause the autonomous vehicle to delay execution of the maneuver until the second object leaves the second limited field of view.

The above-described technologies present various advantages of conventional sensor technology for an autonomous vehicle. First, the above-described technologies enable orientation of articulating sensors with limited fields of view based on a type of maneuver that is executed by the autonomous vehicle. Second, the above-described technologies improve operation of the autonomous vehicle by prioritizing sensor coverage of important regions surrounding the autonomous vehicle. Third, use of articulating sensors in the autonomous vehicles helps to overcome the above-discussed limited field of view problem.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
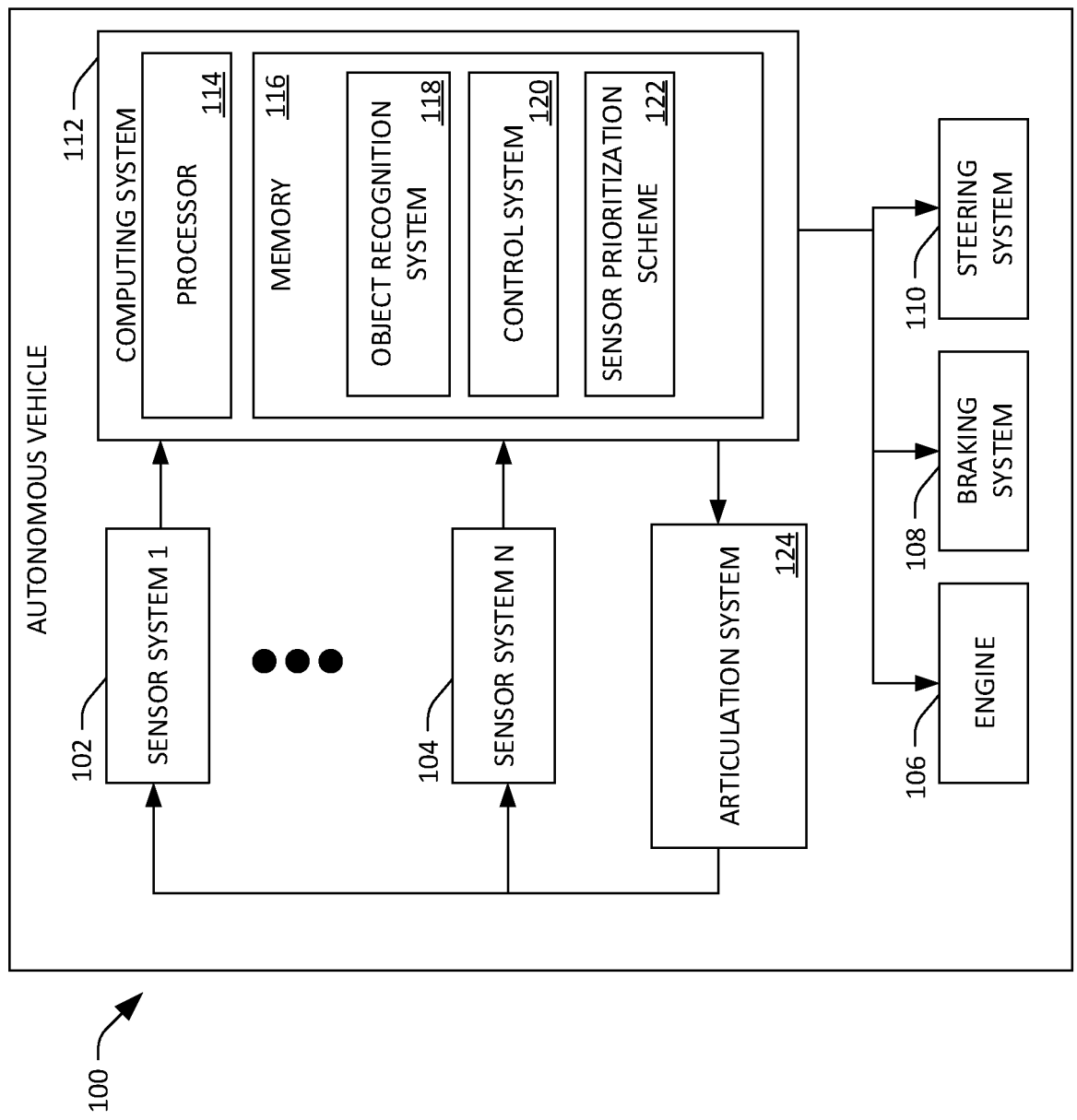
FIG. 1 illustrates an exemplary autonomous vehicle.

Various technologies pertaining to orienting articulating sensors of an autonomous vehicle are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

With reference now to FIG. 1, an exemplary autonomous vehicle 100 is illustrated. The autonomous vehicle 100 can navigate about roadways without human conduction based upon sensor signals output by sensor systems of the autonomous vehicle 100. The autonomous vehicle 100 includes a plurality of sensor systems 102-104 (a first sensor system 102 through an Nth sensor system 104). The sensor systems 102-104 are of different types and are arranged about the autonomous vehicle 100. For example, the first sensor system 102 may be a lidar sensor system and the Nth sensor system 104 may be a camera (image) system. Other exemplary sensor systems include radar sensor systems, global positioning system (GPS) sensor systems, sonar sensor systems, infrared sensor systems, and the like.

Each sensor system in the plurality of sensor systems 102-104 may comprise multiple sensors. For example, the first sensor system 102 may comprise a first sensor, a second sensor, etc. Furthermore, some or all of the plurality of sensor systems 102-104 may comprise articulating sensors. An articulating sensor is a sensor that may be oriented (i.e., rotated) by the autonomous vehicle 100 such that a field of view of the articulating sensor may be directed towards different regions surrounding the autonomous vehicle 100

The autonomous vehicle 100 further includes several mechanical systems that are used to effectuate appropriate motion of the autonomous vehicle 100. For instance, the mechanical systems can include but are not limited to, an engine 106, a braking system 108, and a steering system 110. The engine 106 may be an electric engine or a combustion engine. The braking system 108 can include an engine brake, brake pads, actuators, and/or any other suitable componentry that is configured to assist in decelerating the autonomous vehicle 100. The steering system 110 includes suitable componentry that is configured to control the direction of movement of the autonomous vehicle 100.

The autonomous vehicle 100 additionally comprises a computing system 112 that is in communication with the sensor systems 102-104 and is further in communication with the engine 106, the braking system 108, and the steering system 110. The computing system 112 includes a processor 114 and a memory 116 that includes computer-executable instructions that are executed by the processor 114. In an example, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 116 comprises an object recognition system 118 that is configured to assign labels to objects (in proximity to the autonomous vehicle 100) captured in sensor signals output by the sensor systems 102-104. These predefined types of objects can include, but are not limited to, pedestrian, bike, car, truck, bus, and static (unknown), where the type "static" can represent telephone poles, construction equipment, etc.). In a specific example, the sensor systems 102-104 may include a radar sensor system. A radar sensor of the radar sensor system can emit a radio wave in a direction external to the autonomous vehicle 100. The radio wave may encounter an object and be reflected back towards the radar sensor, and the object recognition system 118 may assign a label to the object based upon the reflected radio wave.

The memory 116 additionally includes a control system 120 that is configured to receive output of the object recognition system 118, and is further configured to control at least one of the mechanical systems (the engine 106, the brake system 108, and/or the steering system 110) based upon the output of the object recognition system 118.

Figure 2:
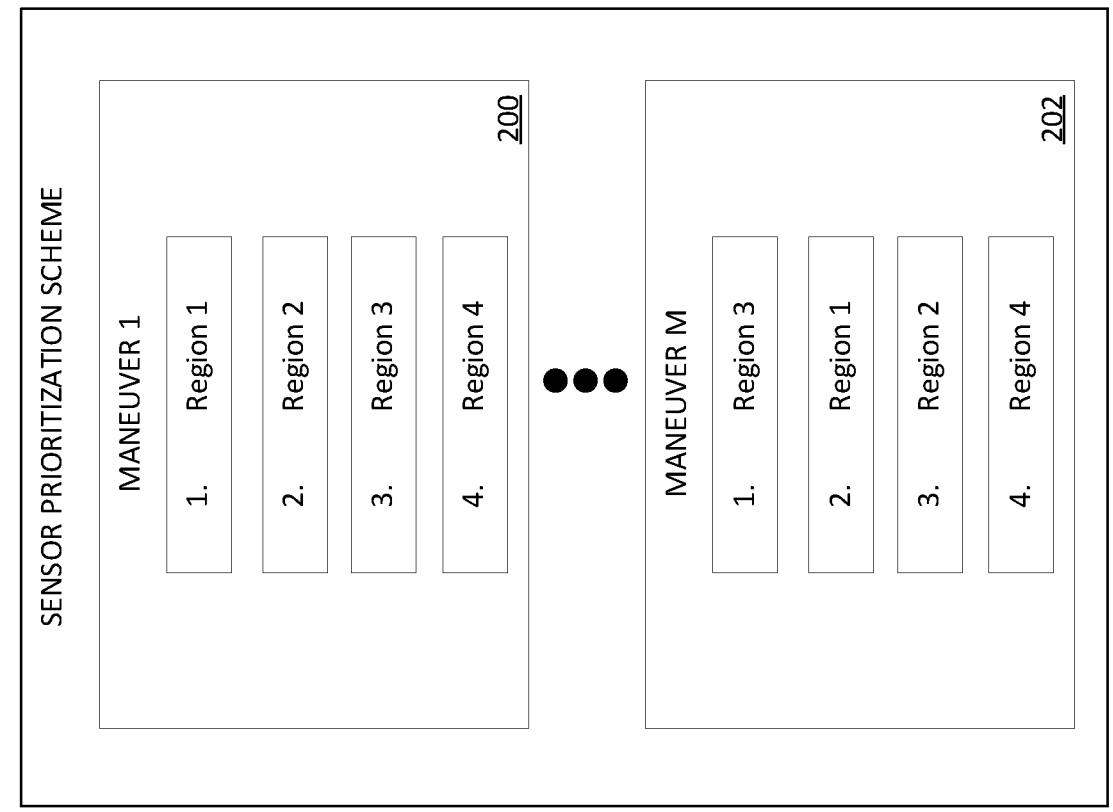
FIG. 2 is a functional block diagram of an exemplary sensor prioritization scheme.

The memory 116 further includes a sensor prioritization scheme 122. Referring briefly now to FIG. 2, the sensor prioritization scheme 122 comprises rankings 200-202 of regions surrounding the autonomous vehicle 100 during different maneuvers performed by the autonomous vehicle 100. Regions with high rankings in the sensor prioritization scheme 122 are regions that have been identified as important to continually monitor with sensors of the autonomous vehicle 100, whereas regions with low rankings in the sensor prioritization scheme 122 are regions that have been identified as less important to continually monitor with sensors. The rankings may be based upon the relative importance of the regions that a human driver would assign to the regions when operating a conventional motorized vehicle. In a non-limiting example, the maneuvers performed by the autonomous vehicle 100 may include maintaining a heading (i.e., going straight), a left turn, a right turn, a U-turn, changing lanes, merging, parking, parallel parking, navigating a traffic circle, backing-up and/or braking.

In the example shown in FIG. 2, the sensor prioritization scheme 122 includes rankings for a first maneuver 200 and rankings for an mth maneuver 202. The rankings for the first maneuver 200 indicate that a first region surrounding the autonomous vehicle 100 has the highest priority, followed by the second region surrounding the autonomous vehicle 100, followed by the third region surrounding on the autonomous vehicle 100, followed by the fourth region surrounding the autonomous vehicle 100. The rankings for the mth maneuver 202 indicate that the third region has the highest priority, followed by the first region, followed by the second region, followed by the fourth region.

While the sensor prioritization scheme 122 has been depicted as ranking a first region, a second region, a third region, and a fourth region, it is to be understood that different maneuvers may have different numbers of ranked regions within the sensor prioritization scheme 122. For instance, the sensor prioritization scheme 122 may include rankings for a third maneuver (not shown) including six regions that are ranked. Furthermore, while not depicted in FIG. 2, it is to be understood that a maneuver in the sensor prioritization scheme 122 may be subdivided into phases, each phase in the maneuver having different rankings of regions surrounding the autonomous vehicle 100. For example, the sensor prioritization scheme 122 may include rankings for a beginning of a left turn (i.e., signaling for a left turn and creeping into an intersection in which the left turn is to occur), a middle of a left turn (i.e., as the autonomous vehicle 100 begins to angle itself to make the left turn), and an end of a left turn (i.e., as the autonomous vehicle 100 is oriented perpendicular to its heading).

Moreover, while not depicted in FIG. 2, it is to be understood that a maneuver in the sensor prioritization scheme 122 may include different rankings for a maneuver based upon whether field of views of sensors of the autonomous vehicle 100 are fully or partially obscured. In an example, for a given maneuver, the sensor prioritization scheme 122 may include a first ranking that is to be used if a field of view of a first sensor directed towards a first region is fully or partially blocked by an object and a second ranking that is to be used if a field of view of a second sensor directed towards a second region is fully or partially blocked.

Referring back to FIG. 1, the autonomous vehicle 100 further comprises an articulation system 124 that is configured to receive output of the object recognition system 118 and/or a sensor prioritization scheme 122 (discussed below) and is configured to articulate (i.e. orient) some or all of the sensors in the plurality of sensor systems 102-104 based upon the output. As such, the articulation system 124 is in communication with the computing system 112 and the plurality of sensor systems 102-104.

Figure 3:
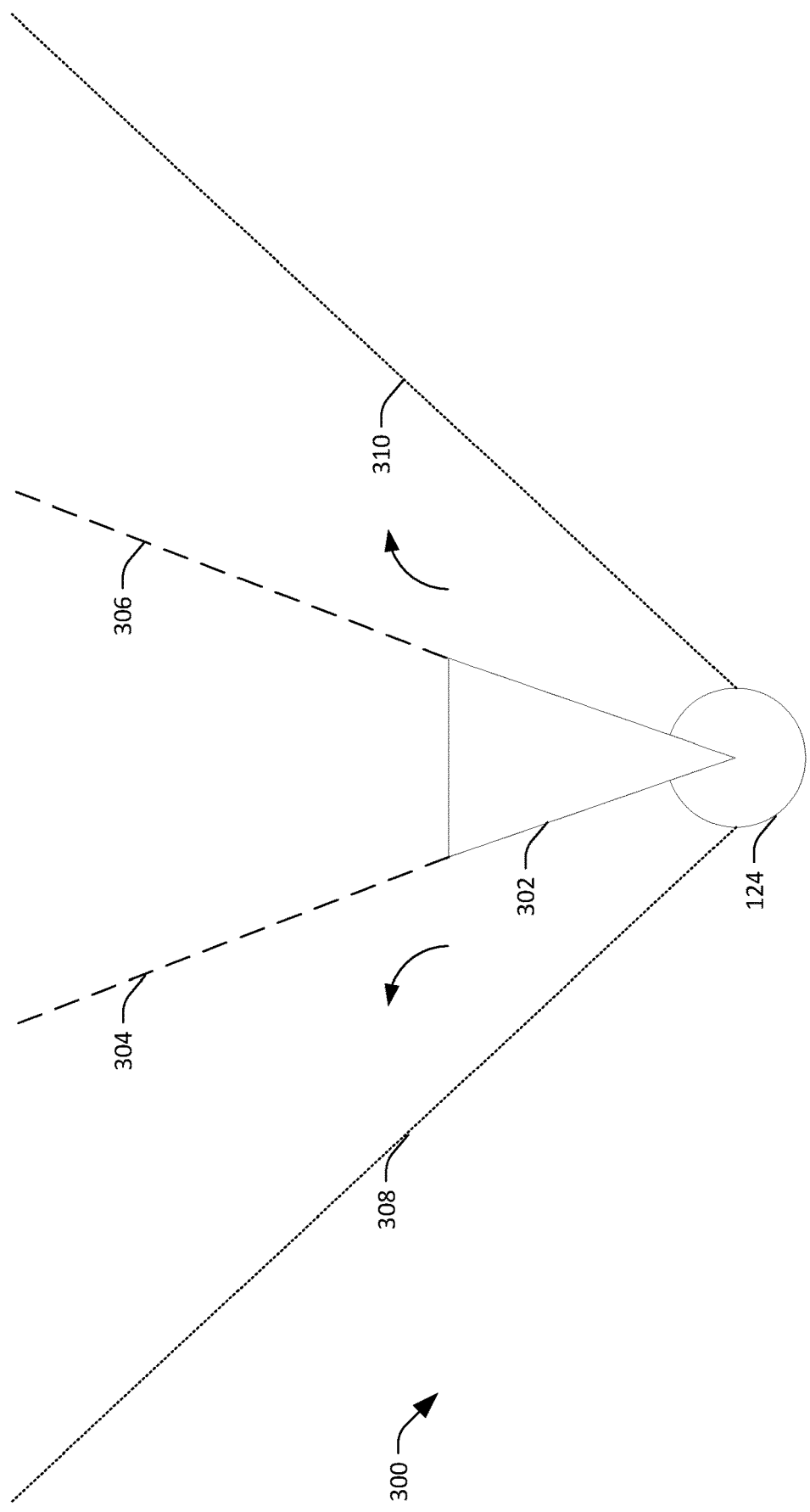
FIG. 3 illustrates an exemplary articulating sensor.

Turning now to FIG. 3, an overhead view 300 of an exemplary articulating sensor 302 is depicted. The articulating sensor 302 may be part of a sensor system in the plurality of sensor systems 102-104 of the autonomous vehicle 100. For instance, the articulating sensor 302 may be mounted on a front of the autonomous vehicle 100, a left side of the autonomous vehicle 100, a right side of the autonomous vehicle 100, a top of the autonomous vehicle 100, a bottom of the autonomous vehicle 100, or a rear of the autonomous vehicle 100. As discussed above, the articulating sensor 302 may be, but is not limited to, a radar sensor, a lidar sensor, or a camera sensor.

The articulating sensor 302 has a limited field of view defined by an angle formed by a first line 304 and a second line 306 (not drawn to scale in FIG. 3). In an example, the first line 304 and the second line 306 define a limited field of view of 10 to 15°. In another example, first line 304 and the second line 306 define a limited field of view of 45 to 60°. The articulating sensor 302 is coupled to the articulation system 124 that is configured to orient (e.g., rotate) the articulating sensor 302 within an area defined by a first boundary line 308 and a second boundary line 310. For instance, the first boundary line 308 and the second boundary line 310 may form an angle of 90 to 150°. In one example, the articulation system 124 may orient the articulating sensor 302 such that the first line 304 overlaps with the first boundary line 308. In a second example, the articulation system 124 may orient the articulating sensor 302 such that the second line 306 overlaps with the second boundary line 310.

While orientation of the articulating sensor 302 is depicted as being constrained by the first boundary line 308 and the second boundary line 310, it is to be understood that in some embodiments the articulation system 124 may rotate the articulating sensor 302 360°.

It is contemplated that the articulation system 124 orients the articulating sensor 302 in a plane parallel to a road on which the autonomous vehicle 100 operates. However, in an embodiment, the articulation system 124 may orient the articulating sensor 302 in a plane perpendicular to the road on which the autonomous vehicle 100 operates. In another embodiment, the articulation system 124 may not be confined to orienting the articulating sensor 302 to a single plane and may instead orient the articulating sensors within different overlapping planes. For instance, the articulating sensor 302 may be mounted on a set of gimbals that offer multiple degrees of freedom (e.g., roll, pitch, yaw, etc.). The articulation system 124 may also be or include a motor.

It is also to be understood that the autonomous vehicle 100 may orient the articulating sensor 302 independent of motion of the autonomous vehicle 100. For instance, the autonomous vehicle 302 may (continually) orient the articulating sensor 302 such that the limited field of view of the articulating sensor 302 remains fixated on a region as the autonomous vehicle moves in a direction.

Referring generally now to FIGS. 1-3, exemplary operation of the autonomous vehicle 100 is now briefly set forth. It is contemplated that the autonomous vehicle 100 is operating on a road or path and that the autonomous vehicle 100 is to perform a maneuver. It is also contemplated that the autonomous vehicle 100 comprises a first sensor with a first limited field of view and a second sensor with a second limited field of view. The first sensor and the second sensor are part of the sensor systems 102-104. Prior to, concurrently with, or subsequent to beginning execution of the maneuver, the computing system 112 of the autonomous vehicle 100 determines a first region and a second region external to and surrounding the autonomous vehicle 100 based upon the sensor prioritization scheme 122.

The computing system 112 then causes the articulation system 124 to orient the first sensor towards the first region such that the first limited field of view of the first sensor encompasses the first region. For instance, the computing system 112 may calculate a point that occurs in a central area of the first region, and the articulation system 124 may orient the first sensor towards the point in the first region such that the point is in a central area of the first limited field of view of the first sensor. The computing system 112 also causes the articulation system 124 to orient the second sensor towards the second region such that the second limited field of view of the second sensor encompasses the second region.

Subsequently, the computing system 112 receives a first sensor signal (e.g., a radar signal, a lidar signal, an image, etc.) from the first sensor indicating that an object has entered the first limited field of view of the first sensor. For instance, the first sensor signal may indicate that an oncoming vehicle has entered the first limited field of view, thereby obscuring the first limited field of view. In an example, the oncoming vehicle may be signaling an intent to make a left turn. Responsive to receiving the first sensor signal, the computing system 112 determines a third region external to the autonomous vehicle 100 based upon the sensor prioritization scheme. The third region has a higher ranking than the second region within the sensor prioritization scheme. As such, the computing system 112 causes the articulation system 124 to orient the second sensor towards the third region such that the second field of view encompasses the third region. As the second sensor is now directed towards the third region, it may then begin to receive sensor signals originating from the third region.

The computing system 112 may repeat the acts of determining regions that are to be assigned sensor coverage and orienting sensors of the autonomous vehicle 100 at a frequency. For instance, the computing system 112 may repeat the acts at a frequency of 5-20 Hz.

The computing system 112 then receives a second sensor signal from the second sensor (and optionally, other sensor signals from other sensors). In an example, the second sensor signal indicates that the third region is clear from objects (e.g., vehicles) that would impede the maneuver, and the computing system 112 causes the autonomous vehicle 100 to complete execution of the maneuver. More specifically, the control system 120 of the computing system 112 may control the engine 106, the braking system 108, and/or the steering system 110 in order to cause the autonomous vehicle 100 to complete the maneuver.

In another example, the second sensor signal indicates that a second object has entered the second limited field of view, wherein the second object impedes completion of the maneuver. In the example, the computing system 112 may cause the autonomous vehicle 100 to delay execution of the maneuver until the second object leaves the second limited field of view. When the second object leaves the second limited field of view, the control system 120 of the computing system 112 may control the engine 106, the braking system 108, and/or the steering system 110 in order to cause the autonomous vehicle 100 to complete the maneuver.

In yet another example, the autonomous vehicle 100 additionally comprises a third sensor having a third limited field of view. The third sensor is in communication with the computing system 112. The third sensor may initially be oriented towards a fourth region external to the autonomous vehicle. Furthermore, the fourth region may have a lower ranking than the second region in the sensor prioritization scheme 122. As such, responsive to causing the articulation system 124 to orient the second sensor towards the third region, the computing system 112 may cause the articulation system 124 to orient the third sensor towards the second region such that the third limited field of view encompasses the second region. The computing system 112 may cause the articulation system 124 to orient the first sensor, the second sensor, and the third sensor concurrently.

In an embodiment, the computing system 112 may initially assign sensors to regions external to the autonomous vehicle 100 using a "greedy" algorithm. Subsequent assignments of sensors may be based upon a least-squares approach.

While the above-described process has been explained with reference to two sensors, it is to be understood that the above-described process may employ many different sensors of many different sensor types.

FIGS. 4-7 depict a sequential series of overhead views of the autonomous vehicle 100 as the autonomous vehicle 100 executes a left turn in a jurisdiction that adheres to a right-hand traffic convention. The autonomous vehicle 100 comprises a first sensor 402 with a first limited field of view, a second sensor 404 with a second limited field of view, and a third sensor 406 with a third limited field of view (collectively, "the sensors 402-406"). The first sensor 402, the second sensor 404, and the third sensor 406 may be part of a sensor system in the plurality of sensor systems 102-104.

FIGS. 4-7 also depict a first region 408, a second region 410, a third region 412, a fourth region 414, and a fifth region 416 (collectively, "the regions 408-416"). While the regions 408-416 depicted as cross-hatched rectangles in FIGS. 4-7, it is to be understood that the regions are not limited to rectangular shapes (from an overhead perspective). For instance, the first region 408 may be a first shape and the second region 410 may be a second shape. Furthermore, while the regions 408-416 are depicted in FIGS. 4-7 as being the same size, it is to be understood that the regions 408-416 may vary in size.

Figure 4:
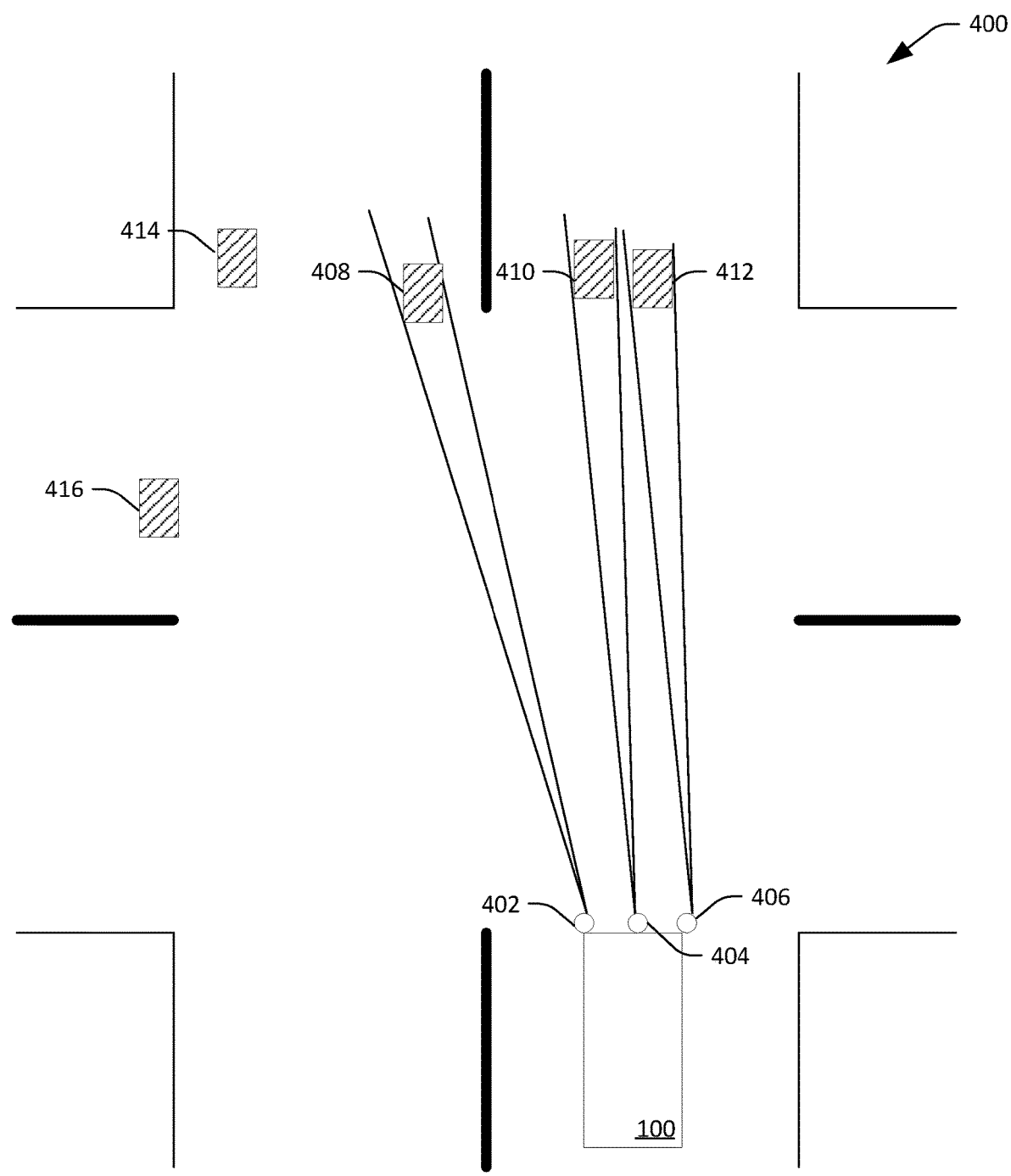
FIGS. 4-7 depict overhead views of an autonomous vehicle with articulating sensors.

Referring specifically now to FIG. 4, an overhead view 400 of the autonomous vehicle 100 as the autonomous vehicle 100 heads straight is depicted. As described above, the computing system 112 of the autonomous vehicle 100 may determine, using the sensor prioritization scheme 122, that the first region 408, the second region 410, and the third region 412 require sensor coverage by the sensors 402-406. As such, the computing system 112 may cause the articulation system 124 to orient the first sensor towards the first region 408, the second sensor 404 towards the second region 410, and the third sensor 406 towards the third region 412. The computing system 112 also determines that the fourth region 414 and the fifth region 416 are not currently of high priority using the sensor prioritization scheme 122. As such, the fourth region 414 and the fifth region 416 remain uncovered by the sensors 402-406 of the autonomous vehicle 100.

Figure 5:
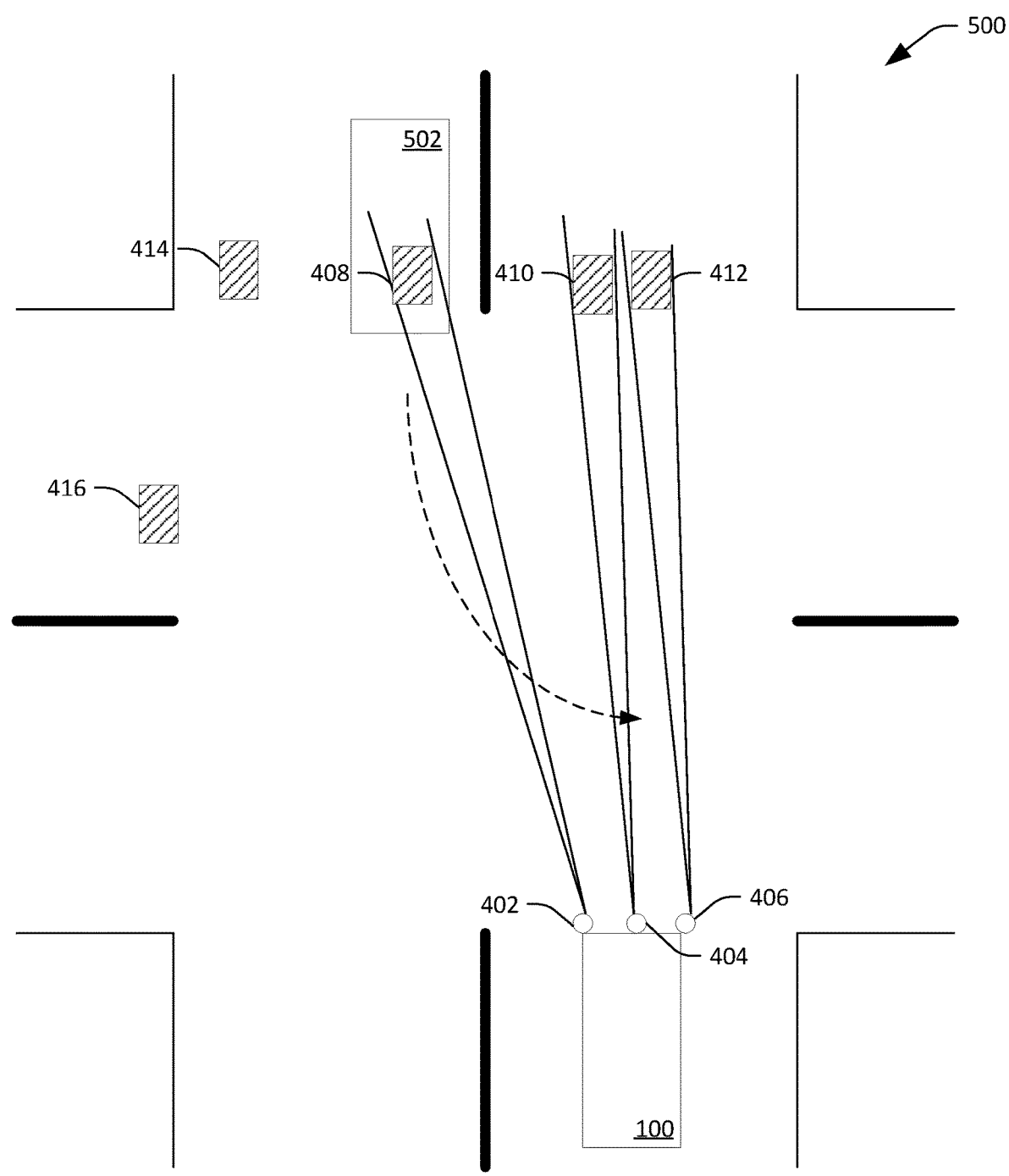

With reference to FIG. 5, an overhead view 500 of the autonomous vehicle 100 and an oncoming vehicle 502 is depicted. In the overhead view 500, the oncoming vehicle 502 has entered the first limited field of view of the first sensor 402, thereby obscuring sensor coverage of the first sensor 402. The oncoming vehicle 502 is signaling its intent to make a left turn (e.g., by way of a left turn signal of the oncoming vehicle 502).

Figure 6:
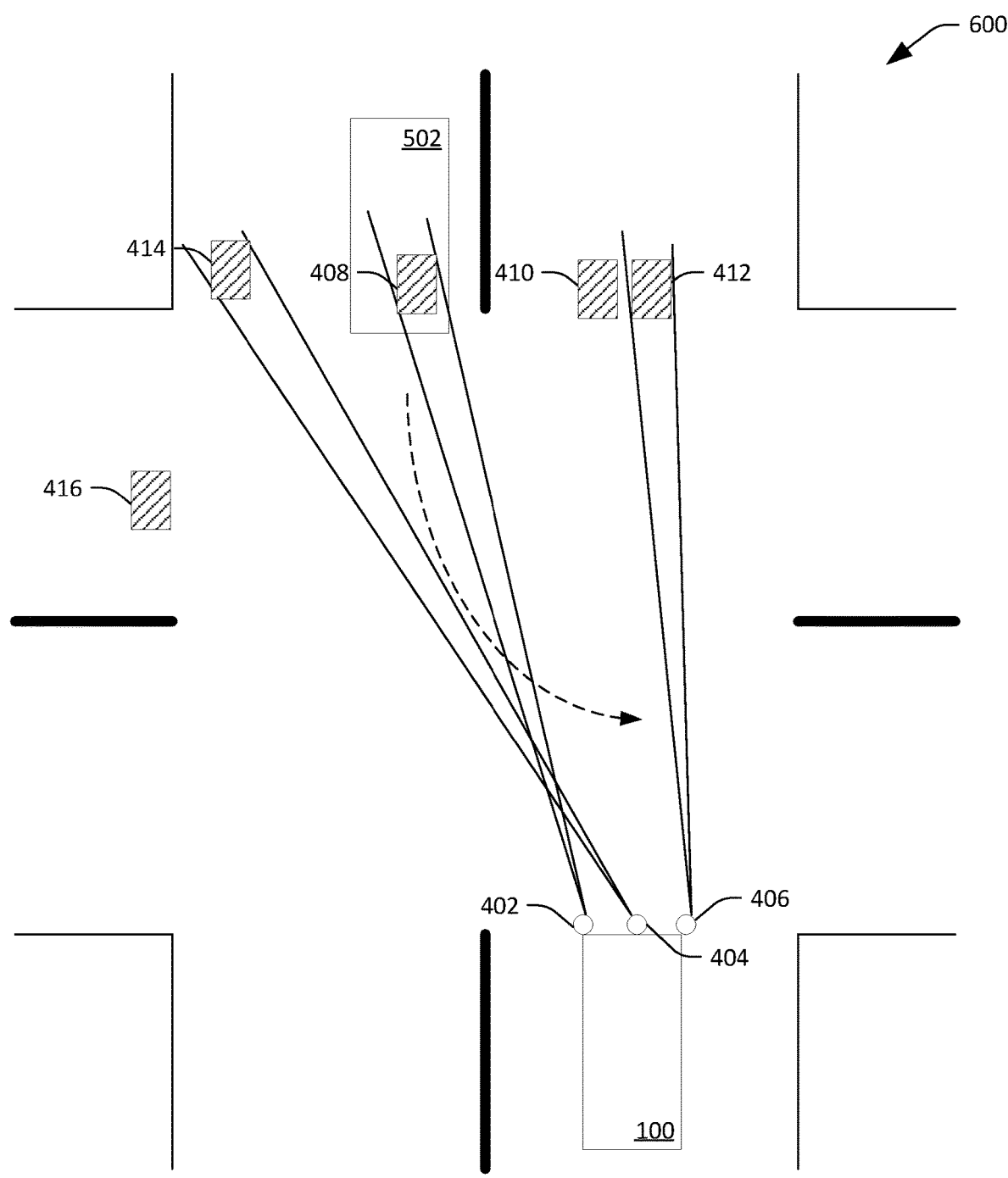

Referring now to FIG. 6, an overhead view 600 of the autonomous vehicle 100 depicting reorientation of the sensors 402-406 is shown. As the oncoming vehicle has entered the first limited field of view of the first sensor 402, the computing system 112 of the autonomous vehicle 100 determines that the fourth region 414 now has increased in priority within the sensor prioritization scheme 122. For instance, the computing system 112 may determine that the second region 410 is now of lower priority than the fourth region 414 within the sensor prioritization scheme 122. As such, the computing system 112 causes the articulation system 124 to orient the second sensor 404 towards the fourth region 414.

Figure 7:
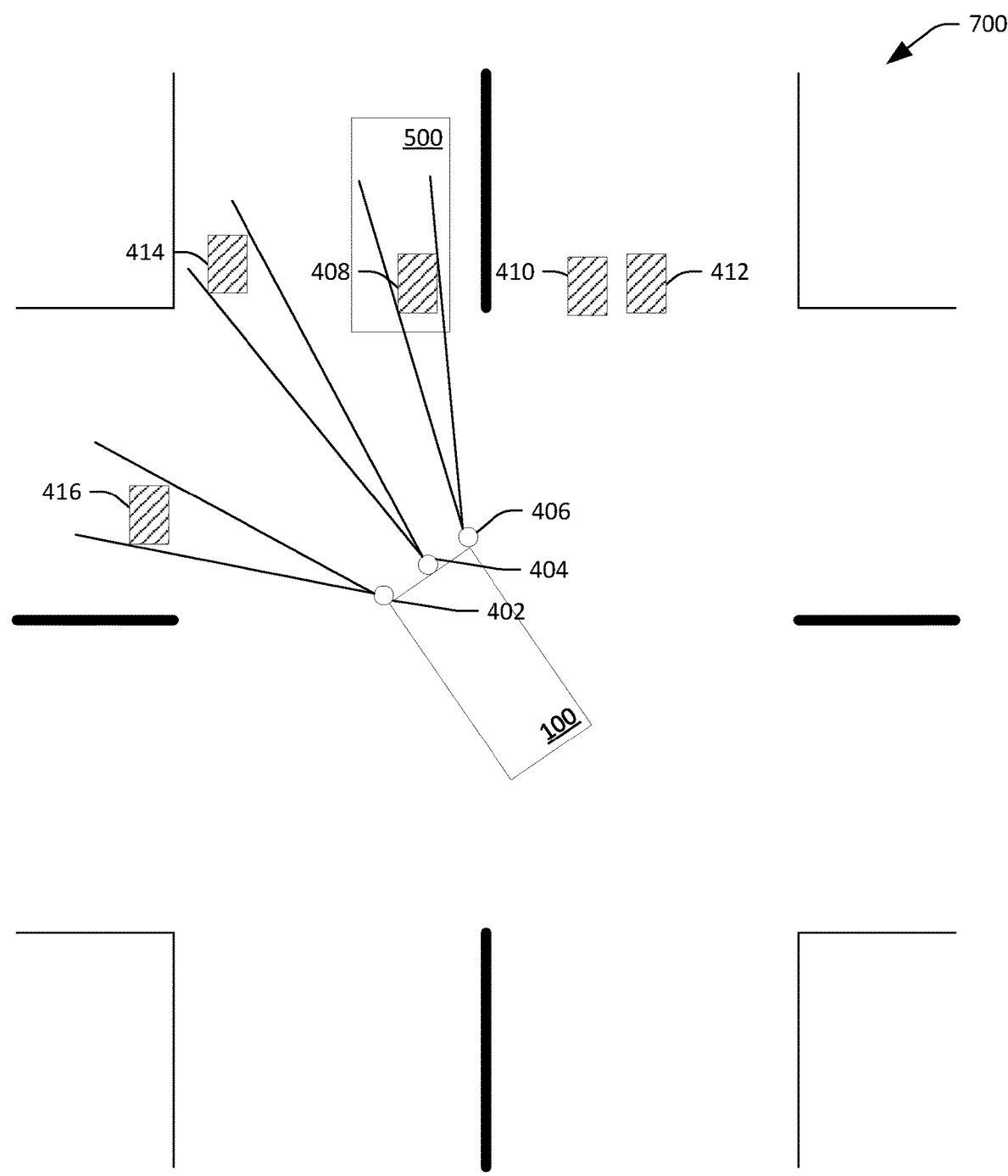

Turning now to FIG. 7, an overhead view 700 of the autonomous vehicle 100 depicting further reorientation of the sensors 402-406 as the autonomous vehicle 100 is in the process of executing the left turn is shown. As the autonomous vehicle 100 performs the left turn, the computing system 112 may determine that the fifth region 416 is now of higher priority than the third region 412 within the sensor prioritization scheme 122. Moreover, the computing system 112 may also determine (using the sensor prioritization scheme 122) that the first sensor 402 will more effectively cover the fifth region 416 and that the third sensor 406 will more effectively cover the first region 408 based on a current position of the autonomous vehicle 100. Accordingly, the computing system 112 causes the articulation system 124 to orient the first sensor 402 towards the fifth region 416 and the third sensor 406 towards the first region 408. The computing system 112 causes the articulation system 124 to have the second sensor 402 remain directed towards the fourth region 414. The autonomous vehicle 100 may then complete execution of the left turn.

Figure 8:
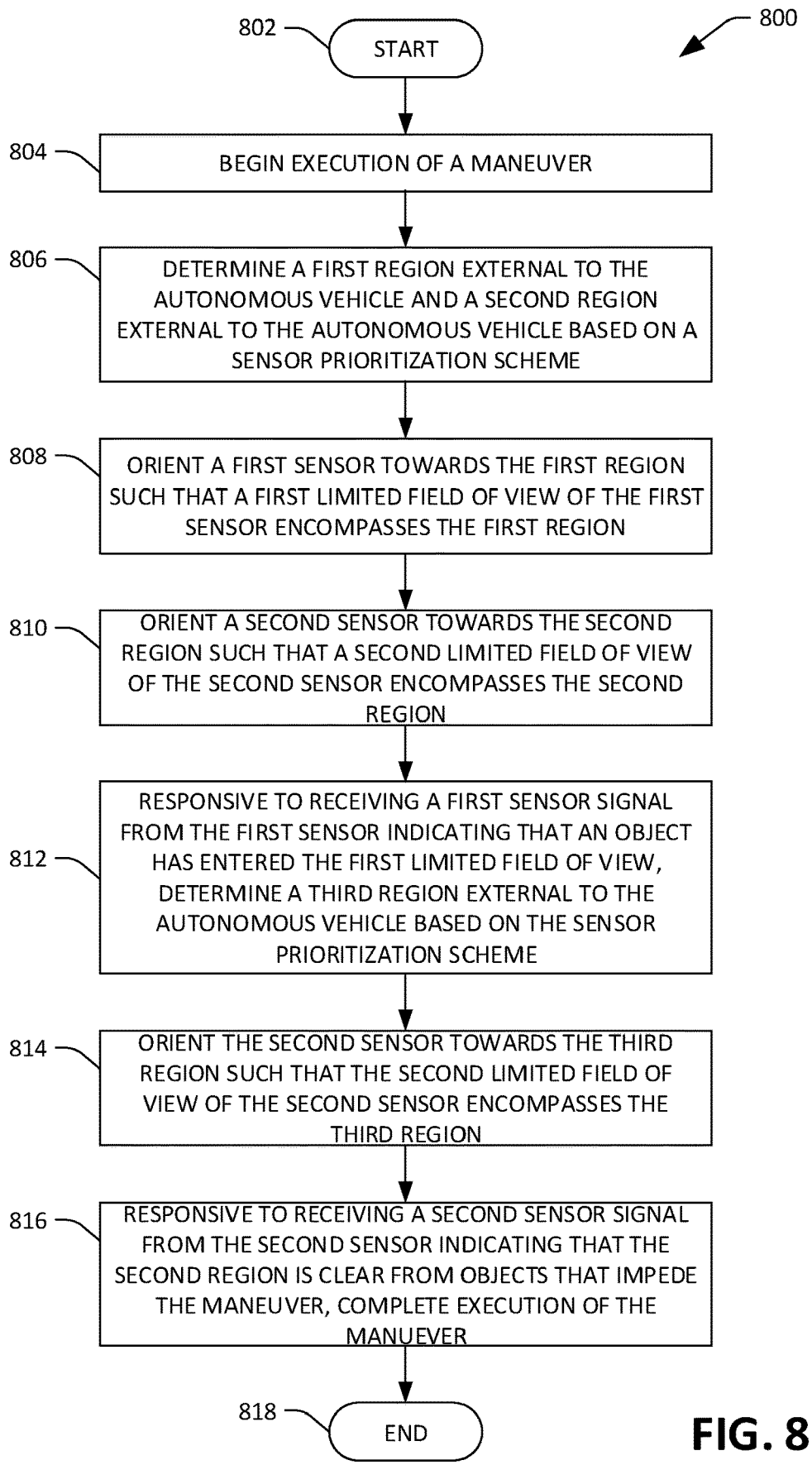
FIG. 8 is a flow diagram illustrating an exemplary methodology for orienting articulating sensors of an autonomous vehicle.
Figure 9:
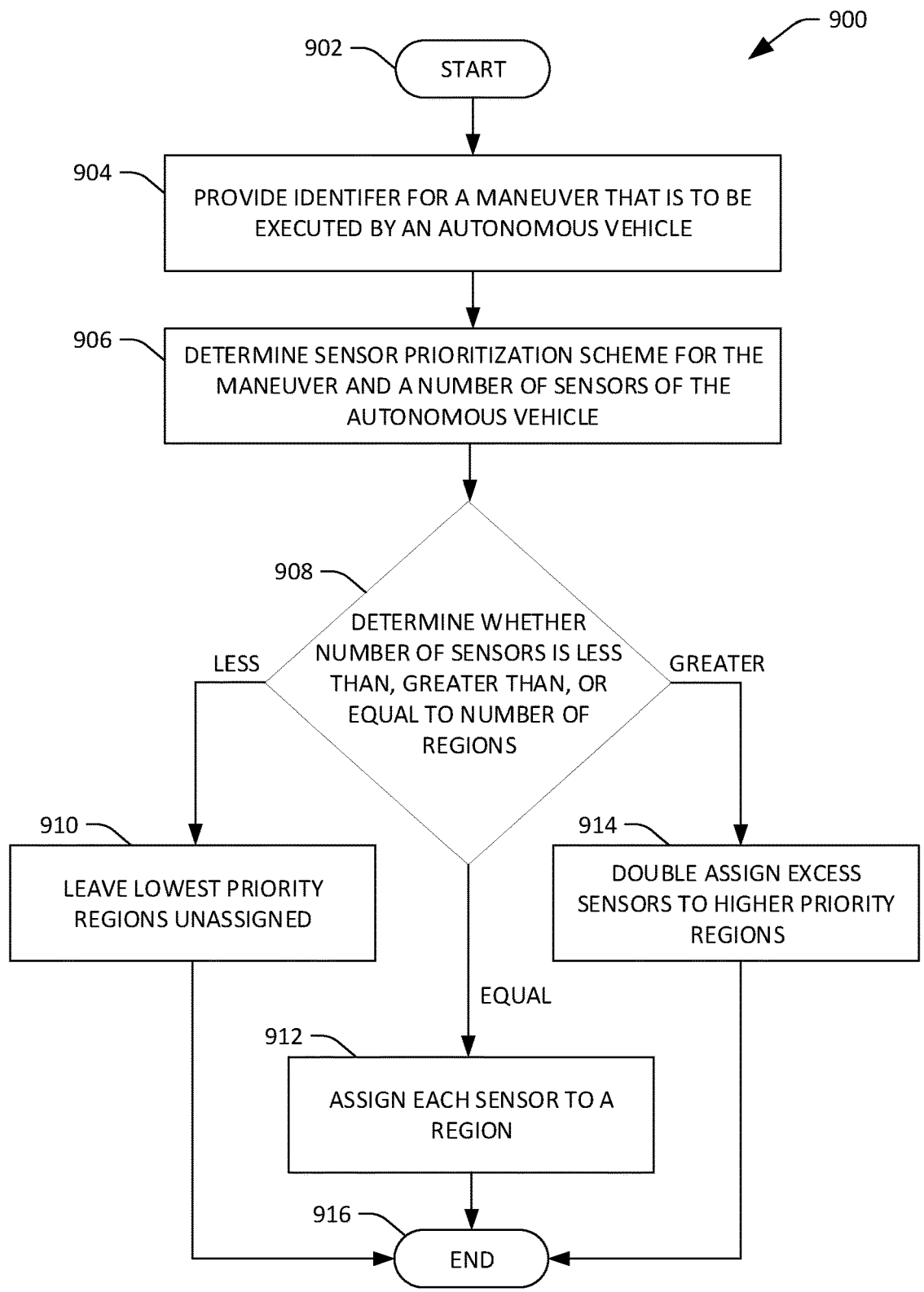
FIG. 9 is a flow diagram illustrating an exemplary methodology for assigning sensors of an autonomous vehicle to regions surrounding the autonomous vehicle based upon a sensor prioritization scheme.

FIGS. 8 and 9 illustrate exemplary methodologies relating to orienting articulating sensors of an autonomous vehicle. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 8, an exemplary methodology 800 for orienting articulating sensors of an autonomous vehicle is illustrated. The methodology 800 begins at 802, and at 804, the autonomous vehicle begins execution of a maneuver. At 806, responsive to beginning execution of the maneuver, the autonomous vehicle determines a first region external to the autonomous vehicle and a second region external to the autonomous vehicle based upon a sensor prioritization scheme. The sensor prioritization scheme comprises a ranking of regions surrounding the autonomous vehicle. At 808, the autonomous vehicle orients a first sensor of the autonomous vehicle towards the first region such that a first limited field of view of the first sensor encompasses the first region. At 810, the autonomous vehicle orients a second sensor of the autonomous vehicle such that a second limited field of view of the second sensor encompasses the second region.

At 812, responsive to receiving a first sensor signal from the first sensor indicating that an object has entered the first limited field of view of the first sensor, the autonomous vehicle determines a third region external to the autonomous vehicle based upon the sensor prioritization scheme. The third region has a higher ranking than the second region within the sensor prioritization scheme. At 814, the autonomous vehicle causes the articulation system to orient the second sensor towards the third region such that the second field of view encompasses the third region. At 816, responsive to receiving a sensor signal from the second sensor indicating that the second region is clear from objects that impede completion of the maneuver, the autonomous vehicle completes execution of the maneuver. The methodology 800 completes at 818.

Turning now to FIG. 9, an exemplary methodology 900 executed by a computing system of an autonomous vehicle that facilitates assigning sensors of the autonomous vehicle to regions surrounding the autonomous vehicle is illustrated. The methodology 900 begins at 902, at 904, the computing system provides an identifier for a maneuver (e.g., a left turn) that is to be executed by the autonomous vehicle. At 906, the computing system determines a sensor prioritization scheme for the maneuver and a number of (available) sensors of the autonomous vehicle.

At 908, the computing system determines whether the number of sensors is less than, equal to, or greater than the number of regions in the sensor prioritization scheme. When the number of sensors is less than the number of regions, at 910, the computing system assigns the sensors to higher priority regions in the sensor prioritization scheme and leaves the lowest priority region(s) in the sensor prioritization scheme unassigned. When the number of sensors is equal to the number of regions, at 912, the computing system assigns each sensor in the sensors to a (different) region in the regions. When the number of sensors is greater than the number regions, at 914, the computing system assigns each sensor in the sensors to a (different) region in the regions and assigns excess sensors to higher priority regions in the sensor prioritization scheme. For instance, different sensors in the sensors may have different fields of view from one another and it may be advantageous to assign two different sensors to the same region. Additionally, a field of view of one of the sensors in the sensors may become blocked during operation of the autonomous vehicle, which further increases the desirability of assigning more than one sensor to the same region in order to maintain continuous sensor coverage of a region. The methodology 900 completes at 916.

Figure 10:
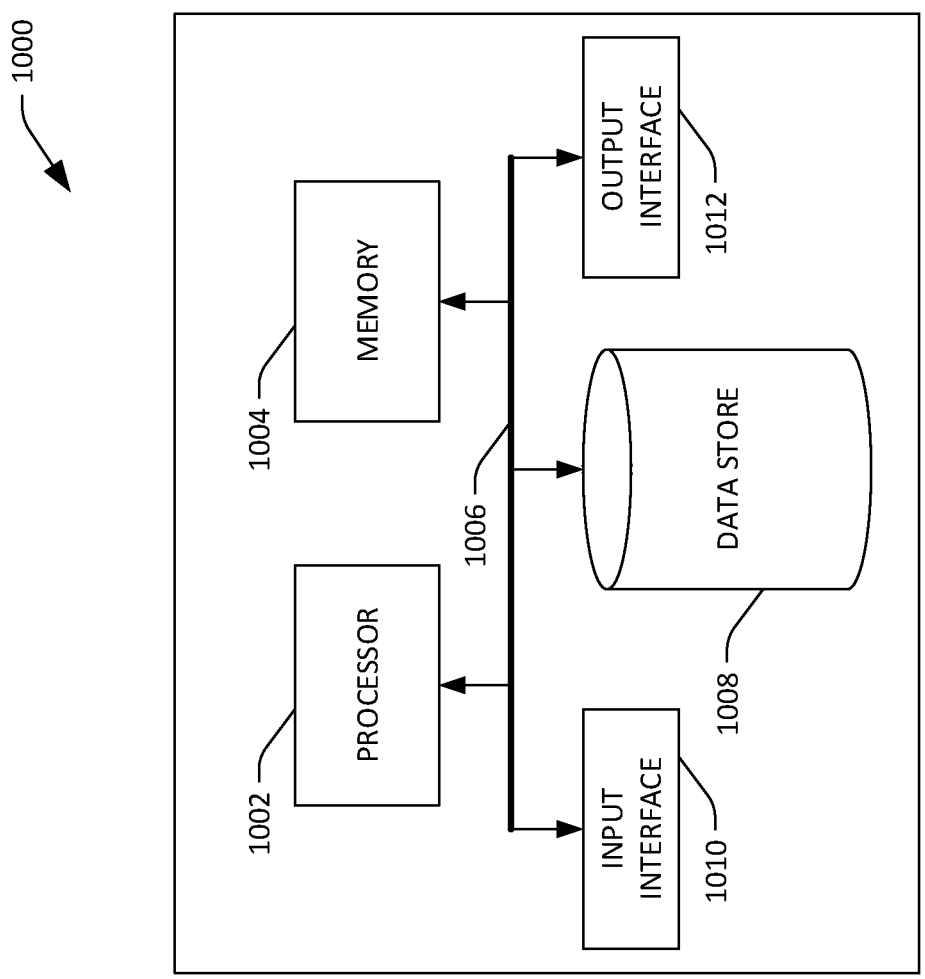
FIG. 10 is an exemplary computing system.

Referring now to FIG. 10, a high-level illustration of an exemplary computing device 1000 that can be used in accordance with the systems and methodologies disclosed herein is illustrated. For instance, the computing device 1000 may be or include the computing system 112. The computing device 1000 includes at least one processor 1002 that executes instructions that are stored in a memory 1004. The instructions may be, for instance, instructions for implementing functionality described as being carried out by one or more modules and systems discussed above or instructions for implementing one or more of the methods described above. The processor 1002 may be a GPU, a plurality of GPUs, a CPU, a plurality of CPUs, a multi-core processor, etc. The processor 1002 may access the memory 1004 by way of a system bus 1006. In addition to storing executable instructions, the memory 1004 may also store sensor prioritization schemes.

The computing device 1000 additionally includes a data store 1008 that is accessible by the processor 1002 by way of the system bus 1006. The data store 1008 may include executable instructions, sensor prioritization schemes, etc. The computing device 1000 also includes an input interface 1010 that allows external devices to communicate with the computing device 1000. For instance, the input interface 1010 may be used to receive instructions from an external computer device, etc. The computing device 1000 also includes an output interface 1012 that interfaces the computing device 1000 with one or more external devices. For example, the computing device 1000 may transmit control signals to the engine 106, the braking system 108, and/or the steering system 110 by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the above-described technologies have been described with reference to a jurisdiction obeying a right-hand traffic (RHT) convention, it is to be appreciated that the above-described technologies may also be employed in a jurisdiction obeying a left-hand traffic (LHT) convention. Thus, in jurisdictions obeying a LHT convention, the above-described technologies are advantageous for an autonomous vehicle that is to perform a right turn.

What is claimed is:

1. An autonomous vehicle comprising:
   an engine;
   a first sensor having a first limited field of view;
   a second sensor having a second limited field of view;
   an articulation system that is configured to orient the first sensor and the second sensor towards regions surrounding the autonomous vehicle; and
   a computing system that is in communication with the engine, the first sensor, the second sensor, and the articulation system, the computing system comprising:
      a processor; and
      memory that stores instructions that, when executed by the processor, cause the processor to perform acts comprising:
         determining a first region external to the autonomous vehicle and a second region external to the autonomous vehicle based on a sensor prioritization scheme, wherein the sensor prioritization scheme comprises a ranking of the regions surrounding the autonomous vehicle;
         causing the articulation system to orient the first sensor towards the first region such that the first limited field of view encompasses the first region and orient the second sensor towards the second region such that the second limited field of view encompasses the second region;
         responsive to receiving a first sensor signal from the first sensor indicating that an object has entered the first limited field of view of the first sensor, determining a third region external to the autonomous vehicle based on the sensor prioritization scheme, the third region having a higher ranking than the second region within the sensor prioritization scheme; and
         causing the articulation system to orient the second sensor towards the third region such that the second limited field of view encompasses the third region.

2. The autonomous vehicle of claim 1, wherein the first sensor is a first radar sensor, wherein the second sensor is a second radar sensor.

3. The autonomous vehicle of claim 1, wherein the first sensor is a first lidar sensor, wherein the second sensor is a second lidar sensor.

4. The autonomous vehicle of claim 1, wherein the first sensor is a first camera, wherein the second sensor is a second camera.

5. The autonomous vehicle of claim 1, wherein the first limited field of view is 10 to 15 degrees, wherein the second limited field of view is 10 to 15 degrees.

6. The autonomous vehicle of claim 1, wherein the acts further comprising:
prior to determining the first region external to the autonomous vehicle and the second region external to the autonomous vehicle, causing the autonomous vehicle to begin to execute a maneuver, wherein determining the first region external to the autonomous vehicle and the second region external to the autonomous vehicle occurs responsive to causing the autonomous vehicle to begin to execute the maneuver.

7. The autonomous vehicle of claim 6, wherein the acts further comprising:
subsequent to causing the articulation system to orient the second sensor towards the third region external to the autonomous vehicle, receiving a second sensor signal from the second sensor, the second sensor signal indicating that the third region is clear from objects that impede the maneuver; and
responsive to receiving the second sensor signal, causing the autonomous vehicle to complete execution of the maneuver.

8. The autonomous vehicle of claim 7, wherein the maneuver is a left turn, wherein the object is an oncoming vehicle that is displaying a left turn signal.

9. The autonomous vehicle of claim 8, wherein the autonomous vehicle further comprises a braking system and a steering system, wherein causing the autonomous vehicle to begin to execute the maneuver comprises controlling at least one of the braking system, the steering system, or the engine, and further wherein causing the autonomous vehicle to complete execution of the maneuver comprises controlling at least one of the braking system, the steering system, or the engine.

10. The autonomous vehicle of claim 1, wherein the object is one of:
a car;
a truck;
a bus;
a static object; or
a pedestrian.

11. The autonomous vehicle of claim 1, wherein the articulation system orients the first sensor and the second sensor in a plane parallel to a road on which the autonomous vehicle is operating.

12. The autonomous vehicle of claim 1, wherein the autonomous vehicle further comprises a third sensor having a third limited field of view, the third sensor in communication with the computing system, wherein the third sensor is oriented towards a fourth region external to the autonomous vehicle, and further wherein the fourth region has a lower ranking than the second region in the sensor prioritization scheme, the acts further comprising:
responsive to causing the articulation system to orient the second sensor towards the third region, causing the articulation system to orient the third sensor towards the second region such that the third limited field of view encompasses the second region.

13. A method performed by an autonomous vehicle comprising an engine, a first sensor having a first limited field of view, a second sensor having a second limited field of view, and an articulation system, the method comprising:
beginning execution of a maneuver;
responsive to beginning execution of the maneuver, determining a first region external to the autonomous vehicle and a second region external to the autonomous vehicle based on a sensor prioritization scheme, wherein the sensor prioritization scheme comprises a ranking of regions surrounding the autonomous vehicle;
causing the articulation system to orient the first sensor of the autonomous vehicle towards the first region such that the first limited field of view encompasses the first region;
causing the articulation system to orient the second sensor of the autonomous vehicle towards the second region such that the second limited field of view encompasses the second region;
responsive to receiving a first sensor signal from the first sensor indicating that an object has entered the first limited field of view of the first sensor, determining a third region external to the autonomous vehicle based on the sensor prioritization scheme, the third region having a higher ranking than the second region within the sensor prioritization scheme;
causing the articulation system to orient the second sensor towards the third region such that the second field of view encompasses the third region; and
responsive to receiving a second sensor signal from the second sensor, the second sensor signal indicating that the second region is clear from objects that impede the maneuver, completing execution of the maneuver.

14. The method of claim 13, wherein the articulation system orients the first sensor and the second sensor in a plane parallel to a road on which the autonomous vehicle is operating.

15. The method of claim 13, wherein the autonomous vehicle further comprises a braking system and a steering system, wherein beginning execution of the maneuver comprises controlling at least one of the braking system, the steering system, or the engine, and further wherein completing execution of the maneuver comprises controlling at least one of the braking system, the steering system, or the engine.

16. The method of claim 13, wherein the maneuver is a left turn, wherein the object is an oncoming vehicle that is displaying a left turn signal.

17. The method of claim 13, wherein the rankings in the sensor prioritization scheme are based on the maneuver that is performed by the autonomous vehicle.

18. An autonomous vehicle comprising:
a computer-readable storage medium that comprises instructions that, when executed by one of more graphics processing units (GPUs) of the autonomous vehicle, cause the one or more GPUs to perform acts comprising:
as the autonomous vehicle executes a maneuver, determining a first region external to the autonomous vehicle, a second region external to the autonomous vehicle, and a third region external to the autonomous vehicle based on a sensor prioritization scheme, wherein the sensor prioritization scheme comprises a ranking of regions surrounding the autonomous vehicle, wherein the second region has a higher ranking than the third region within the sensor prioritization scheme;
causing an articulation system of the autonomous vehicle to orient a first sensor of the autonomous vehicle towards the first region such that the first limited field of view encompasses the first region;
causing the articulation system to orient a second sensor of the autonomous vehicle towards the second region such that the second limited field of view encompasses the second region;

causing the articulation system to orient a third sensor of the autonomous vehicle towards the third region such that the third limited field of view encompasses the third region;

responsive to receiving a first sensor signal from the first sensor indicating that an object has entered the first limited field of view of the first sensor, determining a fourth region external to the autonomous vehicle based on the sensor prioritization scheme, the fourth region having a higher ranking than the second region within the sensor prioritization scheme;

causing the articulation system to orient the second sensor towards the fourth region such that the second limited field of view encompasses the fourth region; and causing the articulation system to orient the third sensor towards second region such that the third limited field of view encompasses the second region.

19. The autonomous vehicle of claim 18, wherein the maneuver is a left turn, wherein the object is an oncoming vehicle that is displaying a left turn signal.

20. The autonomous vehicle of claim 18, wherein the rankings in the sensor prioritization scheme are based on the maneuver that is performed by the autonomous vehicle.

* * * * *